Dec. 2, 1941.     A. FARIA     2,264,514
FISHING REEL
Filed Dec. 12, 1938
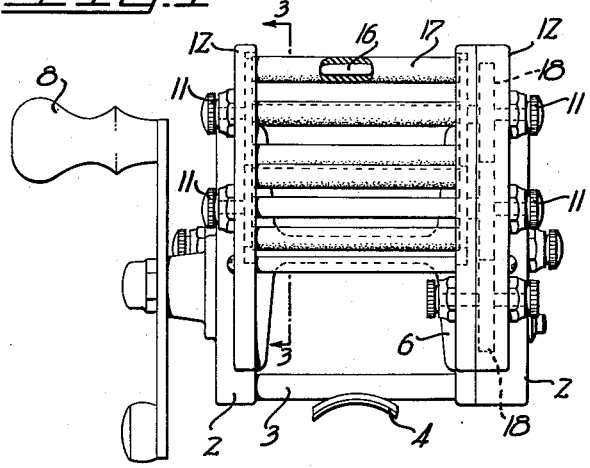
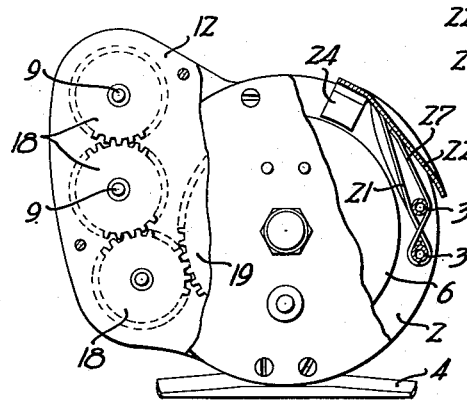
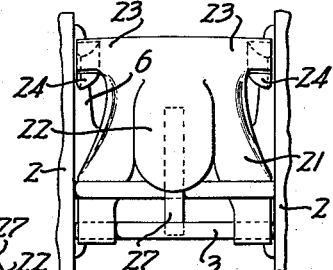
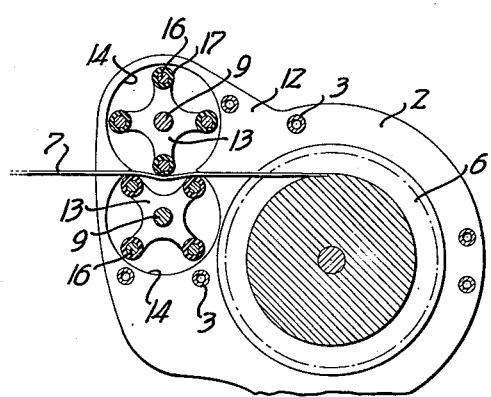
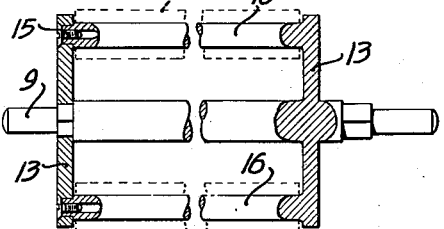
INVENTOR
ANTHONY FARIA
BY Charles J. Evans
HIS ATTORNEY Patented Dec. 2, 1941

2,264,514

UNITED STATES PATENT OFFICE 2,264,514

FISHING REEL

Anthony Faria, San Francisco, Calif., assignor of one-half to Joseph Schor, San Francisco, Calif.

Application December 12, 1938, Serial No. 245,187

6 Claims. (Cl. 242—84.1)

My invention relates to reels employed in fishing, and more particularly to casting reels.

It is among the objects of my invention to provide a reel in which backlashing is prevented by the provision of means for feeding the line from the spool.

Another object is to provide a line feeding means operating in time with the rotation of the spool, whereby the spool cannot overrun the speed at which the line is being drawn from it.

Another object is to provide a line feeding means which operates easily, without detracting from the smooth running action of the reel.

A further object is to provide a line feeding means of the character described which operates without undue wearing of the line.

A still further object is to provide a line feeding means having a slight beating or whipping action that tends to free the line when caught between adjacent convolutions on the spool.

A still further object is to provide a feeding means of the character described in which the whipping action on the line tends to shake excess water from it when the latter is reeled in.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a front elevational view of a reel embodying the improvements of my invention; and Figure 2 is a side view of the same, partly in section and partly in elevation, showing the feed rotor drive gears and also showing the brake.

Figure 3 is a vertical sectional view of the reel, taken in a plane indicated by line 3—3 of Figure 1; and Figure 4 is a detail sectional view showing one of the feed rotors.

Figure 5 is a fragmentary rear elevation view showing the brake.

In the use of fishing reels for casting purposes the principal problem is to prevent the line from backlashing and tangling on the spool. Casters control this by "thumbing" the spool, but even skilled casters cannot always prevent a backlash, and the amateur is usually in trouble. Backlashing is caused primarily because the spool is allowed to overrun the speed at which the line is leaving it, thereby causing the line to wrap up backwards on the spool. Another reason is that the line is sometimes wedged between adjacent convolutions, thus tending to carry the line around with the running spool.

So-called "antibacklash" devices have been developed, but these do not solve the problem. The level-winding devices are helpful, but a backlash can occur with a level wound spool as well as any other. Friction bearings have also been provided for the spool in an attempt to prevent overrunning, but this is not a positive preventive and is open to serious objection in putting a drag on the spool and shortening the length of cast.

I have approached the problem in a different and more fundamental way be providing means for feeding the line from the spool so that the line is withdrawn positively and uniformly and with a linear velocity substantially equal to the peripheral speed of the spool. My reel therefore positively prevents backlashing, even in the hands of the most inexperienced caster.

In terms of broad inclusion, the reel embodying my invention comprises a spool for holding a line, and means for feeding the line from the spool. The feeding means preferably frictionally engages the line, and in my preferred embodiment comprises a pair of rotors between which the line passes. The feed rotors are mounted for rotation with the spool, and the peripheral speed of the rotors is timed to impart a linear velocity to the line substantially equal to the maximum peripheral speed of the line on the spool. The rotors are preferably star-shaped and are preferably intermeshed slightly to engage the line at spaced points, so that the peripheral portions of the rotors intermittently engage successive portions of the line with a slight beating or whipping action. A brake is also preferably provided for the spool.

In greater detail, and referring to the drawing, the reel embodying my invention comprises a frame having end plates 2 connected by cross rods 3 and provided with a base piece 4 for clamping the reel on a rod. A spool 6 for holding the line 7 is journaled in the end plates of the frame, and is actuated by a handle 8. These parts of the reel may be of any suitable material and of any desired construction.

In my improved reel means are provided for feeding the line from the spool. For this purpose a pair of feed rotors are preferably journaled on the frame and are arranged ahead of the spool so that the line passes between the rotors. These rotors preferably comprise shafts 9 extending transversely of the frame on axes substantially parallel to the spool axis, and journaled in suitable bearings 11 mounted on extensions 12 of frame plates 2. The ends of the rotors comprise star-shaped end sections 13 mounted on shafts 9 and lying in recesses 14 of the frame. A plurality of cross bars 16 are connected between end sections 13 and form the periphery of the rotor. Bars 16 are preferably formed integral with one end section and the latter is also preferably formed integral with the shaft; the other end section engaging a squared portion of the shaft and being fastened to the free ends of cross bars 16 by screws 15.

The rotors are therefore of open cage-like construction, with peripheral bars 16 extending parallel to each other and disposed circumferentially of the rotor shafts to form spaced peripheral edges on the rotors. If desired the rotors could be made solid with blade-like spokes extending out to form the spaced peripheral edges. The open construction is preferred however because of lighter weight.

As best shown in Figure 3, the star or cog-like rotors are disposed one above the other and are slightly intermeshed so that line 7 is engaged at spaced points. The rotors are preferably so spaced that there is no direct contact between them, and are preferably intermeshed just enough to insure engagement with the line; this being indicated in Figure 3 by the slight deflection in the line between the points of contact. The peripheral portions of the rotors thus frictionally engage the line, and when the rotors are driven the cross bars 16 intermittently engage successive portions of the line to feed the latter from the spool. In order to promote frictional engagement with the line, bars 16 are preferably covered with a frictional material such as rubber tubing 17.

Means are provided for connecting the feed rotors for rotation with spool 6. As shown in Figure 2, a train of gears 18 is arranged in one side of the frame to mesh with a gear 19 on the spool shaft; two of the gears 18 being mounted on the rotor shafts and the third gear operating as an idler. Gear 19 preferably has a diameter substantially equal to that of the spool, and gears 18 are of a diameter substantially equal to that of the rotors, so that the peripheral speed of the rotors is substantially equal to that of the spool, that is, equal to the outer convolutions of line on the spool when the spool is full.

Naturally, as line is withdrawn from the spool the diameter of the convolutions becomes less and less. The peripheral speed of the rotors is thus always as great or greater than that of the line on the spool, and the rotors therefore tend to feed the line out at a rate equal to or exceeding that at which the line is leaving the spool. My line feeding means therefore positively prevents backlashing, because the spool cannot overrun the rate at which the line is leaving it.

Another advantage of my feeding means is that the slight beating or whipping action on the line sets up a vibration in the latter which is useful in freeing the line when wedged between adjacent convolutions on the spool. This keeps the line loose and insures a still smoother and freer action of the reel. A similar beating action when the line is being reeled in serves to shake excess water from the line.

The feed rotors offer little resistance to rotation and do not detract from the smooth running of the reel. Furthermore, the light frictional engagement between the rotors and the line effects the desired feeding action without undue wearing of the line. As shown in Figure 3 of the drawing, the rotors do not have a positive feeding action but rather impart a beating or whipping action, which is sufficient to feed the line out during casting yet is not a positive enough feeding action to pull the line in against the tension of the latter when reeling in. In other words, the fact that the rotors are turning faster than the spool does not mean that the line is drawn in faster than the rate at which it is being wrapped upon the spool, it being understood that rotor elements 17 merely slide along the line when the latter is being reeled in since the light frictional grip of elements 17 on the line is insignificant compared with the tension on the line at this time. During casting however the frictional grip of elements 17 is sufficient to keep the line feeding from the spool and thus prevent backlashing.

Another feature of my improved reel is the provision of a brake comprising a V-shaped plate 21 pivotally mounted on a cross rod 3 of the frame at the back of the reel. A thumb piece 22 is formed on the plate, and laterally extending arms 23 are provided above the thumb piece. Brake shoes 24 are secured to the end of arms 23 and are disposed to engage the rim portions of spool 6 when plate 21 is pressed in. A strap spring 27 supported by cross rods 3 and bearing on the underside of plate 21 urges the brake shoes out of engagement with the spool.

It is to be noted that when the brake is employed to slow down and stop the spool at the end of a cast, the feed rotors are slowed down and stopped in time with the deceleration of the spool. In other words, the braking action on the spool serves to control the movements of both the spool and the feed rotors.

I claim:

1. A fishing reel comprising a spool for holding a line, and a rotor mounted for rotation with the spool and engageable with said line for feeding the latter from the spool, said rotor having circumferentially spaced line engaging elements for engaging successive portions of the line.

2. A fishing reel comprising a spool for holding a line, and a star-shaped rotor journaled on an axis substantially parallel with the spool axis and engageable with said line for feeding the latter from the spool.

3. A fishing reel comprising a spool for holding a line, and a pair of star-shaped rotors between which the line may pass for feeding the latter from said spool.

4. A fishing reel comprising a spool for holding a line, and a pair of intermeshing star-shaped rotors between which the line may pass for feeding the latter from said spool.

5. A fishing reel comprising a spool for holding a line, and a rotor comprising a series of circumferentially disposed bars for engaging said line for feeding the latter from the spool.

6. A fishing reel comprising a spool for holding a line, and line feeding means including a pair of elements for engaging the line at spaced points and a third element engaging the line at a point between said points, said elements being spaced to provide free sections of line between said points of engagement, the third element being arranged to deflect the line out of a straight path between said first mentioned spaced points.

ANTHONY FARIA.